(12) United States Patent
James et al.

(10) Patent No.: US 6,293,715 B1
(45) Date of Patent: *Sep. 25, 2001

(54) SELF CONTAINED POINT OF SALE PRINTING SYSTEM AND METHOD

(75) Inventors: Arthur James, Ithaca; Phillip M. Martinez, Groton; Michael Walls, Ithaca, all of NY (US); Keith Jentoft, Circle Pines, MN (US)

(73) Assignee: Axiohm Transaction Solutions, Inc., Ithaca, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,157

(22) Filed: Oct. 6, 1997

(51) Int. Cl.[7] .................................. B41J 3/42; B41J 5/30
(52) U.S. Cl. ................................................ 400/73; 400/70
(58) Field of Search ........................................ 400/73, 70

(56) References Cited

U.S. PATENT DOCUMENTS

| | | | |
|---|---|---|---|
| 4,394,092 | | 7/1983 | Osmera et al. . |
| 4,672,377 | * | 6/1987 | Murphy et al. ................. 340/825.34 |
| 5,204,811 | * | 4/1993 | Bednar et al. ....................... 364/406 |
| 5,330,275 | * | 7/1994 | Hasewinkle ............................ 400/82 |
| 5,789,727 | * | 8/1998 | Teradaira et al. ..................... 235/449 |

OTHER PUBLICATIONS

Print and Test Specifications for Magnetic Ink Printing (MICR), ANSI X9.27, IEEE EDI Support Services, Chardon, OH.

Information Processing—Magnetic Ink Character Recognition Print Specifications, ISO. 1004: 1995(E), International Organization for Standardization, Geneva, Switzerland.

American National Standard Specifications for Placement and Location of MICR Printing, ANSI X9.13, 1990, American Bankers Association, Washington, D.C.

* cited by examiner

Primary Examiner—John S. Hilten
Assistant Examiner—Charles H Nolan, Jr.
(74) Attorney, Agent, or Firm—Salzman & Levy

(57) ABSTRACT

The present invention features a Point of Sale (POS) printer that includes an encoding module that magnetizes and reads the account and bank information from existing magnetic characters on a check. The encoding module prints the characters in the AMOUNT field of the check, according to ANSI[1], ISO[2], or other standards. The characters are printed with an ink having magnetic particles embedded therein. The POS printer magnetizes and reads these characters after they are printed, in order to verify that the correct amount has been encoded onto the check. The encoding module can include a magnet to magnetize the characters; a read head to read and analyze the signal waveform from each character; and a print mechanism with the capability of using magnetic ink for printing the characters. The method of the invention directs the POS printer to follow a certain sequence of actions in order to accomplish the printing and verification at the point of sale.

17 Claims, 7 Drawing Sheets

SELF CONTAINED POINT OF SALE PRINTING SYSTEM AND METHOD

FIELD OF THE INVENTION

This invention relates to a new point-of-sale printer and check processing method and, more particularly, to a new point of sale (POS) printer and method for printing magnetic ink characters on a check in the AMOUNT field, with subsequent verification that the magnetic characters were correctly printed.

BACKGROUND OF THE INVENTION

In retail establishments, it is often found that the retailer does not have the means to print (encode) MICR (Magnetic Ink Character Recognition) characters on a check. In such a case, the retailer typically pays the bank(s) a fee for printing and verifying these characters. In those cases where the retailer has purchased an encoding machine to encode the checks, the encoding is performed as a separate task, at a later time than the sale itself. In either case, the subsequent printing of MICR characters on ae check is wasteful both of time and money for the retailer. The present invention suggests that it is more useful to print these characters at the point of sale (POS), and actually provides a new method and apparatus for processing checks at the point of sale.

The present invention pertains to a point of sale (POS) printer capable of encoding and verifying MICR characters on checks. More particularly, the invention provides the retailer with the capability for printing MICR characters, and for printing these characters in the AMOUNT field of the check. (Hereinafter, the word "encode" shall be used to mean "to print the amount of the sale in magnetic ink characters in the AMOUNT field of the check.")

This invention allows a retailer to save money and/or time in one of two ways:

(a) Having the POS printer of this invention, a retailer can print and verify these characters at the time of sale. This saves the retailer money, while saving banks the time to perform this procedure.

(b) A retailer having a POS printer need not purchase an encoding machine to encode the checks. Neither need he or she encode the checks as a separate task at a later time than that of the sale. The retailer having the POS printer of this invention saves the time and labor by performing this task at the point of sale, not as a separate function performed at a later time. In addition, the retailer can reconcile checks sooner allowing for earlier availability of funds (reduced "float" time ) than when the bank must encode the checks.

The POS printer of this invention includes an encoding module that magnetizes and reads the account and bank information from the existing magnetic characters on the check. The encoding module prints the characters according to ANSI[1], ISO[2], or other standards using an ink having magnetic particles embedded therein. The POS printer magnetizes and reads these characters after they are printed, in order to verify that the correct AMOUNT has been encoded onto the check. The encoding module may comprise a magnet to magnetize the characters; a read head to read the signal waveform from each character; electronic circuitry to analyze these waveforms; and a print mechanism with the capability of using magnetic ink for printing the characters. Certain read heads, such as DC-biased read heads, do not require a magnet to pre-magnetize the characters. In such a case, the encoding module may comprise a DC-biased read head, electronic circuitry and a magnetic ink printer.

Our copending U.S. patent application, Ser. No. 08/944, 155, describes a check processing procedure, and is hereby incorporated by reference.

SUMMARY OF THE INVENTION

In accordance with the present invention, there is provided a POS printer that includes an MICR reader that magnetizes and reads the account and bank information from preprinted magnetic characters on a check. An encoding module prints the characters in the AMOUNT field of the check, according to ANSI[1], ISO[2], or other standards. The characters are printed with an ink having magnetic particles embedded therein. The POS printer magnetizes and reads these characters after they are printed, in order to verify that the correct amount has been encoded onto the check.

The encoding module can comprise a magnet to magnetize the characters; a read head to read the signal waveform from each character; electronic circuitry to analyze these waveforms; and a print mechanism with the capability of using magnetic ink for printing the characters.

Currently, the AMOUNT field is printed by the retailer, or the customer's bank after the purchase transaction has occurred. The encoding module of the POS printer allows for the customer's check to have the AMOUNT field printed and verified, while the customer is still at the point of sale.

The method of the invention directs the POS printer to follow a certain sequence of actions in order to accomplish the printing and verification at the point of sale. First, the ROUTING and ON-US (see FIG. 1) fields of the check are magnetized, either by a fixed magnet, or within the read head itself. Next, the characters within the ROUTING and ON-US fields are read by the read head, and the signals analyzed by the electronics of the POS printer. This is followed by a validation, in which the printer sends this data to the POS host which electronically accesses a list of "bad" account numbers to determine if the check is good. The printer can continue either to endorse the check on the back, and/or to encode the check by printing MICR characters in the AMOUNT field on the face of the check, if the validation is successful. Check encoding can be effected by utilizing impact/ribbon, laser/toner, inkjet, or thermal transfer printing. Thermal transfer printing can be either parallel (full field width) printing, or serial (one character at a time) printing.

It is an object of this invention to provide a point of sale printer and method.

It is another object of the invention to provide a point of sale printer and method for reading, printing and verifying MICR characters upon a check.

It is a further object of this invention to provide an improved printer that allows for a customer's check to have the AMOUNT field printed and verified, while the customer is still at the point of sale.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a new printer and method for negotiating transactions at the point of sale in retail establishments. The POS printer includes an MICR Printer module that magnetizes and reads the account and bank information from existing magnetic characters on a check. The encoding module prints the characters in the AMOUNT field of the check, according to ANSI[1], ISO[2], or other standards. For purposes of clarity and brevity, like elements and components will bear the same number throughout the figures.

Figure 1:
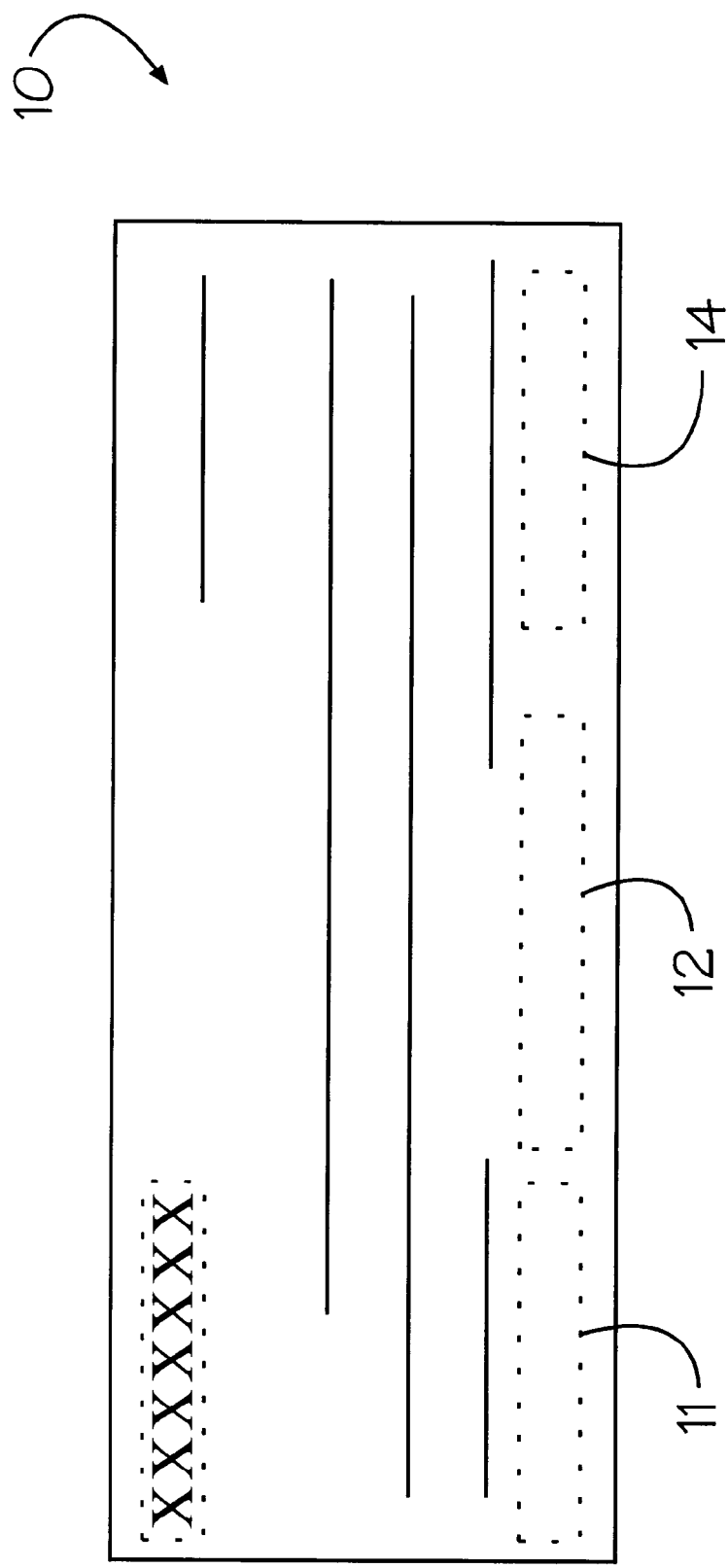
FIG. 1 illustrates a plan view of a typical personal check used at a point of sale transaction.

Now referring to FIG. 1, a typical personal check 10 is shown in plan view. The exact location of various fields of check 10 is defined in the ANSI[3] and ISO[2] specifications. The ROUTING and On Us fields 11 and 12, respectively, convey the bank and account information of the customer's check. These fields are already printed with MICR-readable characters when a customer begins a transaction. Currently, the AMOUNT field 14 is printed by the retailer or the customer's bank after the purchase transaction has occurred.

The encoding module of a POS printer is described hereinafter, with reference to FIGS. 4 through 7. The encoding module allows for the customer's check 10 to have the AMOUNT field 14 printed and verified while the customer is still at the point of sale. The POS printer follows a certain sequence of actions for the sales transaction to be negotiated. The POS printer 20 first magnetizes the ROUTING and ON-US fields 11 and 12, respectively. This can be accomplished either by a fixed magnet, or within the read head itself. Next, the characters within the ROUTING and ON-US fields 11 and 12, respectively, are read by the read head and the signals analyzed by the electronics of the POS printer. This analysis is followed by a validation step, wherein the POS host determines whether the account is on a list of "bad" account numbers. The printer can continue to endorse the check on the back and/or encode the check by printing MICR characters in the AMOUNT field 14 on the face of the check 10, after validation is accomplished. Check encoding can be effected by utilizing impact/ribbon, laser/toner, inkjet, or thermal transfer. Thermal transfer printing can be either in parallel (full line), or in serial (one character at a time). For reasons of simplicity, it is preferred for the printer to contain a serial thermal transfer mechanism that provides MICR characters.

Once the check 10 is encoded, the POS printer verifies that the characters are readable by magnetizing and actually reading the encoded characters. The signals can then be analyzed and compared to the original transaction amount. In the event that the reading of the encoded amount does not correspond to the transaction amount, the retailer may attempt to use the POS printer to reread the encoded amount during the transaction or at a later time. In some cases, it may be necessary for the retailer or bank to add a strip of paper along the bottom of the check and reprint the MICR characters for all the fields: the ROUTING field 11, the ON-US field 12, and the AMOUNT field 14.

Thus, another use for the POS printer is manifest. Since the POS printer can print and read MICR characters, the potential exists for the printer to be used to reprint the ROUTING, ON-US, and AMOUNT fields either at the point of sale or at a later time as a second operation.

Figure 2:
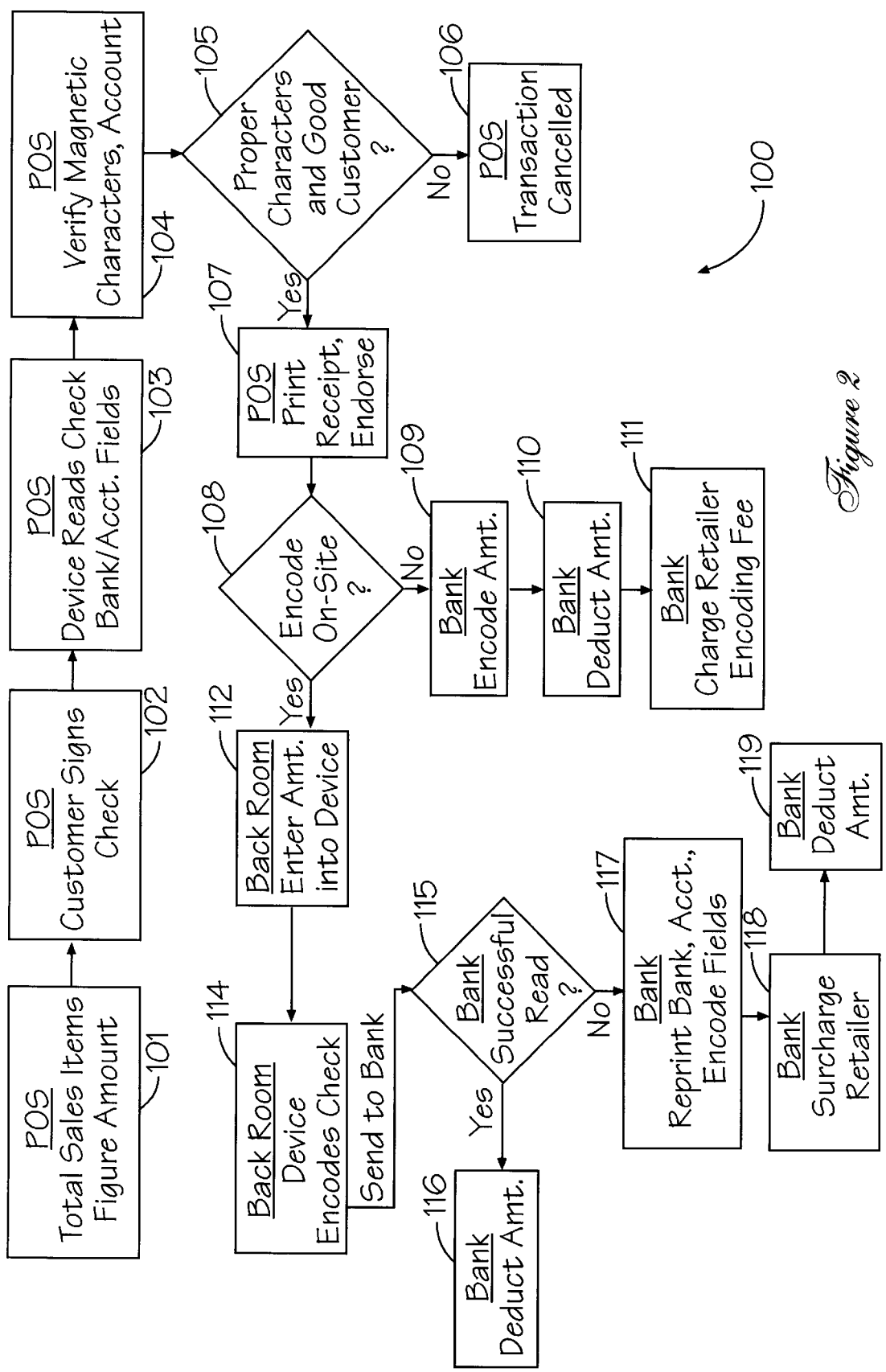
FIG. 2 depicts a flow diagram of a current check processing method.
Figure 3:
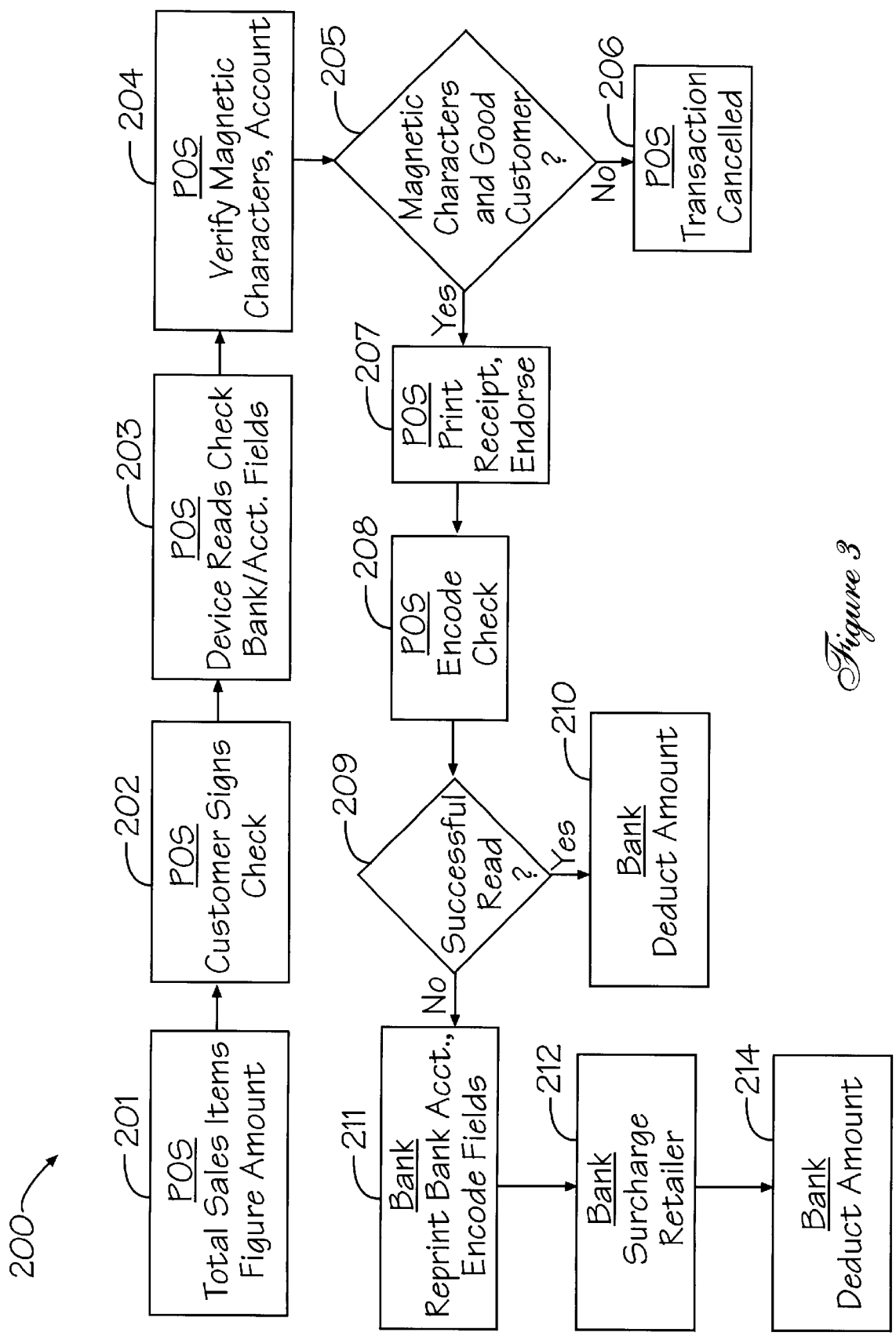
FIG. 3 shows a revised check processing method in accordance with the present invention.

Referring to FIGS. 2 and 3, flowcharts 100 and 200, respectively, demonstrate the conventional and the improved check handling sequence provided by the inventive POS encoding procedure. The basic improvement is realized when the retailer or bank is not required to re-enter the amount on the check 10 in order to encode same. Flowchart 100 depicts the current procedure. At the point of sale, the sales items are totaled and a figure amount of the transaction is provided, step 101. The customer then provides a personal check, and signs same, step 102. A device then reads the check, step 103, and verifies that the customer is a good customer (credit worthy), step 104. If the checking account is a "bad" account, or if the proper characters are missing, step 105, the transaction is canceled, step 106. If the transaction is in order, step 105, the check 10 is endorsed, and a receipt is printed, step 107. If the retail establishment does not have an encoding machine on its premises, step 108, then the check 10 is sent to the bank for encoding, step 109. The bank deducts the amount of the transaction from the account of the customer, step 110, and it then charges the retailer an encoding fee, step 111.

When the retailer has its own encoding equipment, the check 10 is sent to the back room, typically, where the amount is entered onto the check 10, step 112. The check is then encoded, step 114, and then sent to the bank. Decision block 115 is then entered. If the bank can successfully read the encoded characters, it deducts the transaction amount from the account of the customer, step 116. When the bank cannot decipher the encoding, step 115, the bank reprints the check 10 with newly encoded fields, step 117. The bank then exacts a surcharge from the retailer, step 118, and deducts the amount of the transaction from the customer's account, step 119.

Referring to FIG. 3, flowchart 200 illustrates the new transaction procedure in accordance with the invention. At the point of sale, the sales items are totalled and a figure amount of the transaction is provided, step 201. The customer then provides a personal check 10, and signs same, step 202. A device then reads the check, step 203, and verifies whether the customer is a good customer (credit worthy), step 204. If the account is "bad", or the proper magnetic characters are missing, step 205, the transaction is canceled, step 206. If the transaction is in order, step 205, the check 10 is endorsed and a receipt is printed, step 207. The POS printer then encodes the check 10, step 208. If the check 10 can be successfully read, step 209, then the transaction amount is deducted from the customer's account, step 210.

When the bank cannot decipher the check 10, then it reprints the check and encodes the necessary fields, step 211. The bank then exacts a surcharge from the retailer, step 212 and deducts the transaction amount from the customer's account, step 214.

The invention can be embodied in several ways at the point of sale. The preferred method depicted in flowchart 200 requires that MICR characters be printed serially using a thermal transfer ribbon 23. In the serial method, printhead heating elements print a vertical column of dots at each printing station, as the head is moved horizontally with respect to the longest edge of the check 10.

Figure 4:
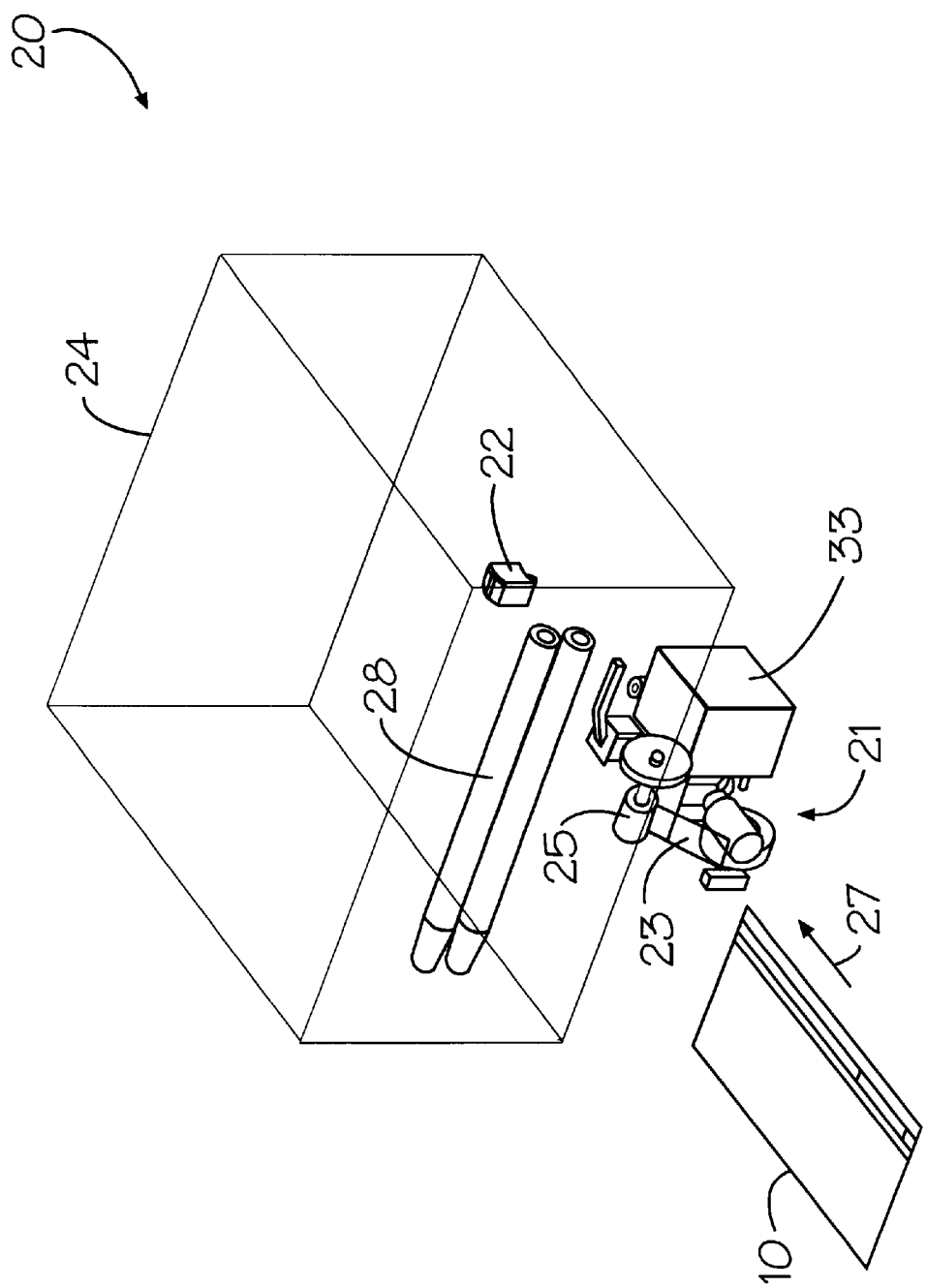
FIG. 4 illustrates a perspective view of a schematic embodiment of a point of sale machine, in accordance with the current invention.

Three embodiments are shown in FIGS. 4 through 7, in which serial encoding of checks is accomplished at the point of sale. The first embodiment for a POS encoding device is useful as an enhancement to an existing POS printer/check processor. This embodiment is shown in FIG. 4. The housing of the machine is shown in schematic outline 24. A typical POS printer 20 has an MICR read head 22 for reading the account and bank information of checks being processed. The encoding mechanism is in the front of the machine and utilizes either a main feed roll system or an auxiliary feed roll system (not shown) within the encode mechanism 21. A second read head 22' is utilized to verify previously encoded amount information.

Figure 5:
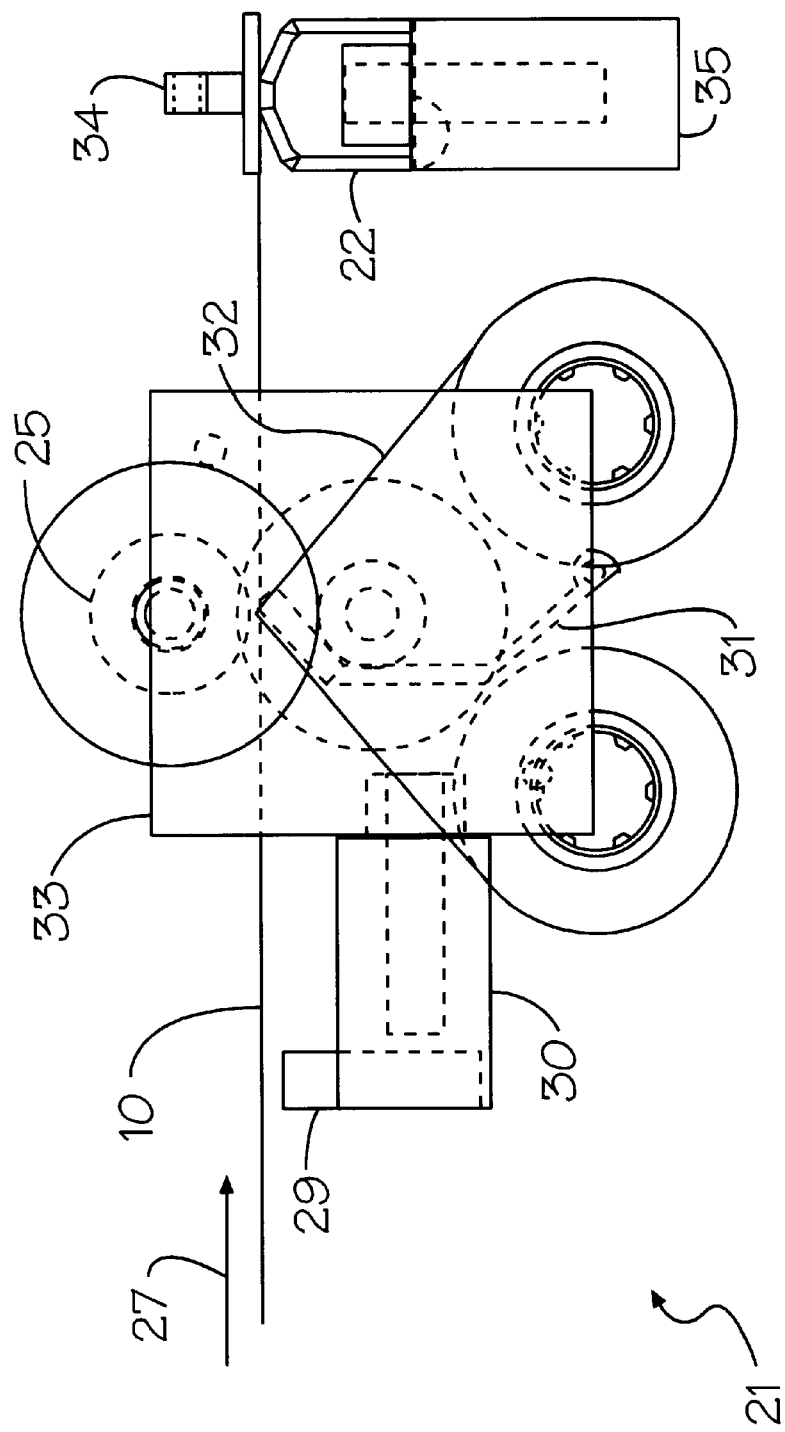
FIG. 5 depicts a side view of the point of sale mechanism shown in FIG. 4.

Referring to FIG. 5, the encode mechanism 21 (FIG. 4) is shown in greater detail. The mechanism 21 uses the print platen 25 to advance the check 10 during the encoding thereof. In the orientation of the readhead 22 (FIG. 4), the check 10 is placed face down and driven by feed rollers 28 into machine 20 in the direction of the arrow 27, in order to read the bank and account information. The POS machine 20 then activates read head 22 to verify the account and funds. Afterwards, the check 10 is driven back out into the encode mechanism 21 by the main feed rollers 28 until a document or paper detection sensor 29 is tripped. The main feed rollers 28 may continue to drive the check 10 a given distance past the sensor 29.

Then, the printhead solenoid 30 allows the printhead 31 to push the check 10 against the platen 25. A switch 43 is provided which verifies that printhead 31 is in the proper position for printing. Subsequently, the main feed rollers 28 release the check 10. In this position, the thermal transfer ribbon 32 is sandwiched between the printhead 31 and the check 10. The check 10 is then driven in the direction of arrow 27 by the platen 25, which is driven by the platen motor 33 through pinion 36 and gear 35. This action also advances the ribbon 32 through an over-running slip drive system comprised of drive pulley 37, garter spring 38, and driven pulley 39. Back tension on the ribbon 32 is provided by a friction system comprised of fixed pulley 40, garter spring 41, and pulley 42. Once the sensor 29 is tripped again, some amount of motor steps can be counted to determine the position of the check 10. When the check 10 is correctly positioned, printhead heaters (not shown) are turned on to create the characters on the check, as it is driven forward into the machine 20.

When the printing cycle is finished, main feed rollers 28 engage the check 10 again, and the printhead solenoid 30 moves the printhead 31 out of the print position and away from platen 25. Another solenoid 35 activates the pad/arm 34 against read head 22' to press the check 10 against the read head 22'. The check 10 can then be driven into the machine 20, and read head 22' verifies that the printed MICR characters represent or are equivalent to the amount of sale. After the encoding process is finished, the POS printer 20 may continue to perform other functions on the check 10, such as printing on the check face, or endorsing the check on its back.

Figure 6:
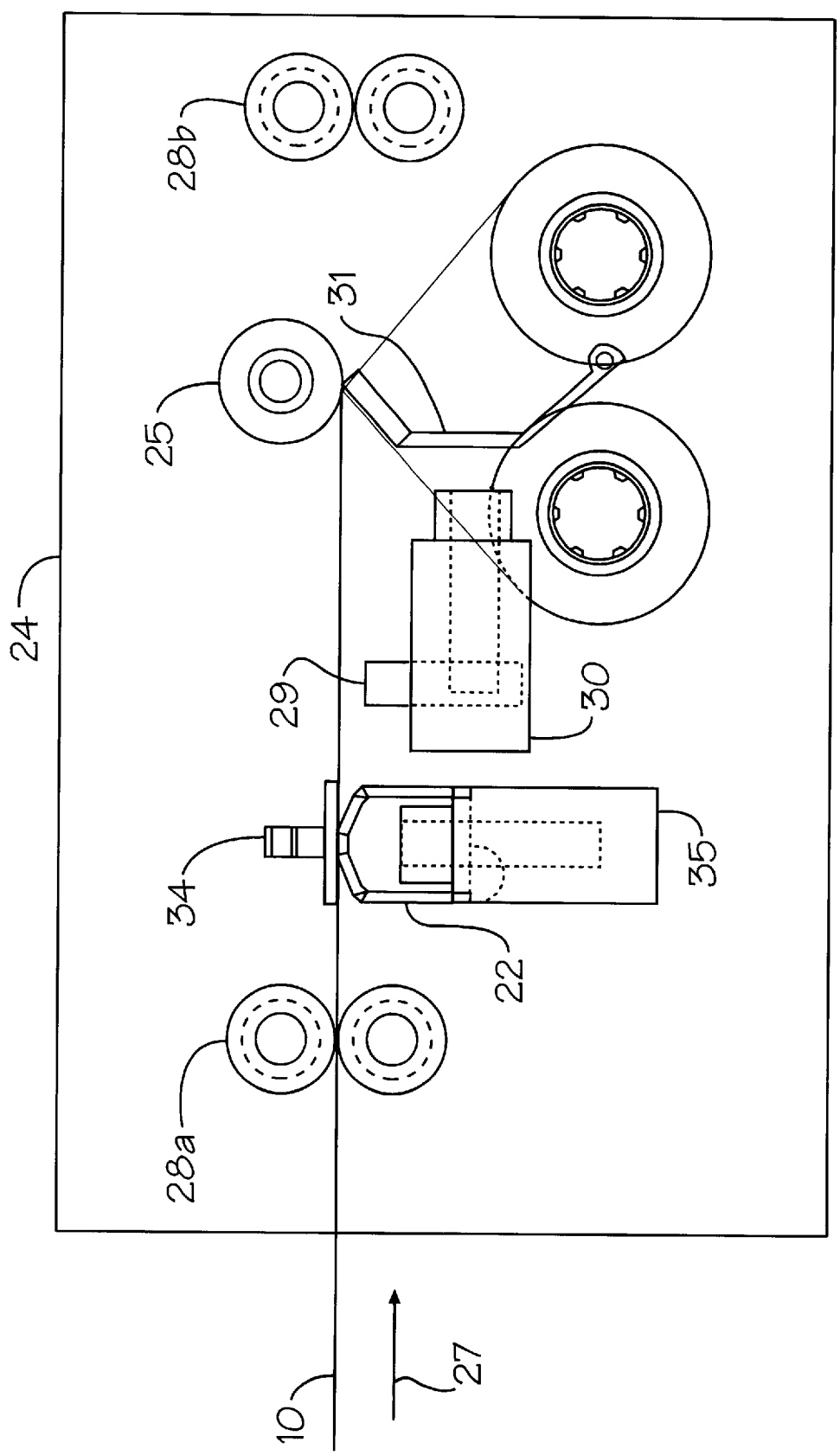
FIG. 6 shows a side view of a second embodiment of a point of sale mechanism.

Referring to FIG. 6, a second embodiment for a POS printer 20 features an encoding mechanism 21 that is internal to the housing 24 of the machine. This is the preferred embodiment, since it tends to keep the size of the POS machine and the number of parts to a minimum.

A side view of a machine 20 is shown, having an internal encoding device 21. In this embodiment, the check 10 is driven by two sets of feed rollers 28a and 28b, respectively. The rollers 28a and 28b are coupled to each other (not shown). The left-hand side represents the front of the machine. The forward set of feed rollers 28a (left-hand side) drives the check (arrow 27) into the machine 20, and the ROUTING and ON-US fields 11 and 12 (FIG. 1) are read by the read head 22.

Once the check 10 has been verified, the check 10 is driven further, and the rear set of feed rollers 28b grip the check and drive it until the trailing edge of the check 10 is past the sensor 29. At this point, the feed rollers 28b position the check 10 to the first printing position. The printhead solenoid 30 then activates the printhead 31 against the platen 25. In contrast to the first embodiment, where a separate motor was provided for driving the platen 25, the existing feed roller system 28b is also used to drive the check 10 and ribbon 23 during the encode process. Once encoding has been completed, the printhead solenoid 30 retracts the printhead 31, the check 10 is driven back past the sensor 29, and the feed rollers then position the check to be read by the read head 22. The pad/arm solenoid 35 then activates the pad/arm 34, and the check 10 is driven to verify the encoded amount. After the read operation, pad/arm 34 is released and the POS machine continues to perform other functions.

The aforementioned embodiments described herein have assumed that the check 10 is face-down in the machine 20, and that the read head 22 is stationary. These embodiments can also easily accommodate a check that is face-up, and can utilize a dynamic read head.

Figure 7:
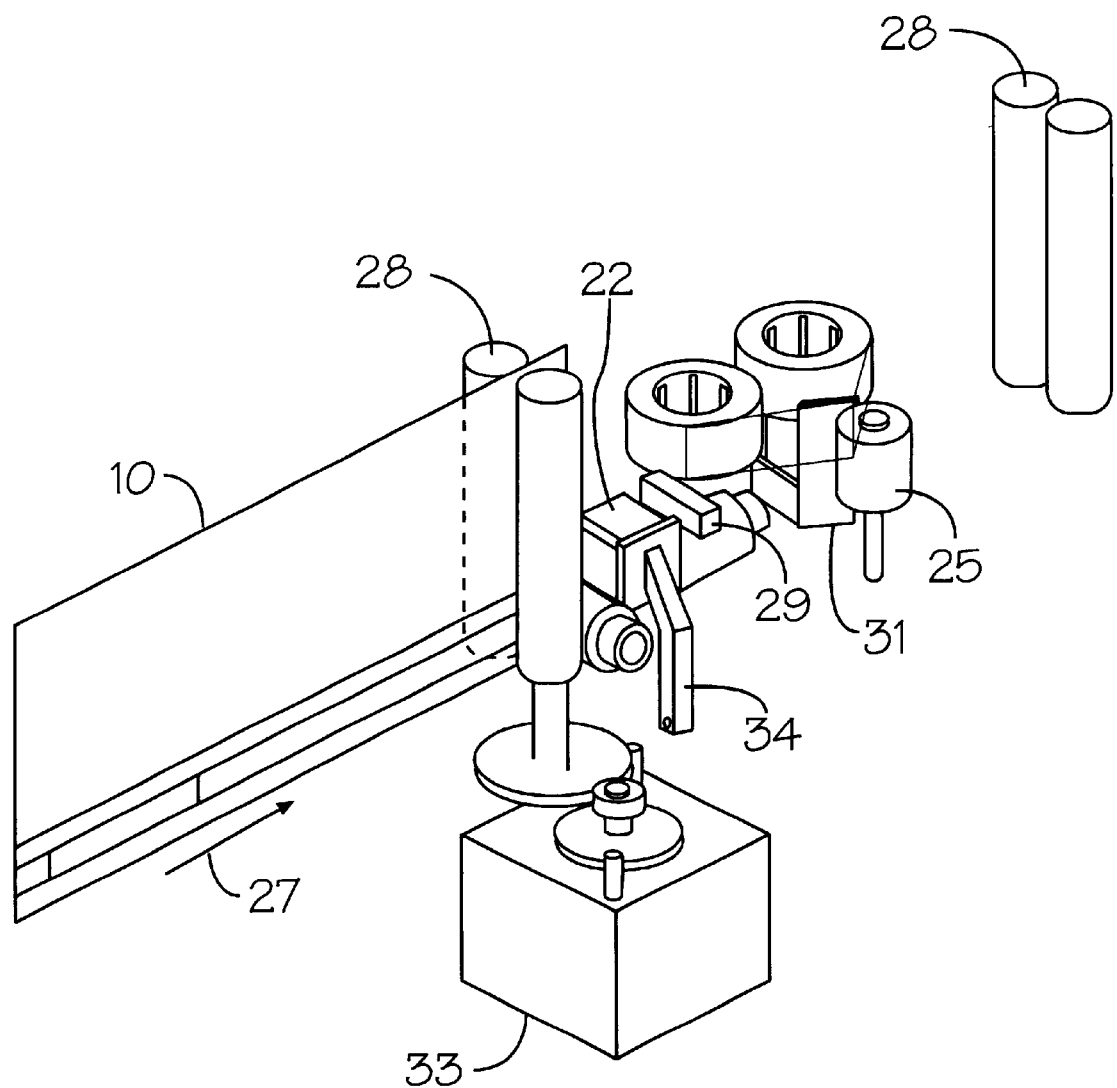
FIG. 7 illustrates a side view of a third embodiment of a point of sale mechanism.

Referring to FIG. 7, a third embodiment for the point of sale encoding device 21 of this invention is illustrated. The encoding device 21 has a separate module that is distinctly apart from the POS printer 20. This mechanism is essentially the same as that shown in FIG. 6, with the exception that the components are external to the machine. Note that the mechanism is depicted in a vertical arrangement. In such an embodiment, a communication line (not shown) to the POS printer would be required. The device would still accomplish the same functions: read the ROUTING and ON-US fields 11 and 12, respectively; verify the bank and account information through the communication line; encode the check 10; and read the encoded amount as a final verification. A separate motor 33 is required for driving the feed rollers 28b. A necessary belt between the sets of feed rollers is not shown. The operation of this embodiment is essentially identical to that of the second embodiment (FIG. 6), and need not be described in detail here.

As can be observed from the foregoing description, this invention proposes that a point of sale printer can be used to print and verify MICR characters on checks. The primary application of this invention is for checks to be encoded directly at the point of sale in order to save retailers time and money. The three embodiments allow for an encoding module to be implemented on the front of a POS printer, internal to the POS printer, or as a separate module to the printer.

REFERENCES

1. Print and Test Specifications for Magnetic Ink Printing (MICR), ANSI X9.27, 1995, EDI Support Services, Chardon, Ohio.
2. Information Processing-Magnetic Ink Character Recognition-Print Specifications, ISO 1004: 1995(E), International Organization for Standardization, Geneva, Switzerland, 1995.
3. American National Standard Specifications For Placement and Location of MICR Printing, ANSI X9.13, 1990, American Bankers Association, Washington, D.C.
4. Method and Apparatus for High Speed Thermal Printing, Osmera et al., U.S. Pat. No. 4,394,092, issued 1983.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A self-contained Point of Sale (POS) printer, comprising an encoding module that magnetizes and reads account and bank information from existing magnetic characters disposed on a check, said encoding module having non-impact printing means for printing MICR characters in an amount field disposed along an edge of a front face of said check, according to a standard using an ink having magnetic particles embedded therein, said encoding module magnetizing and reading said characters after they are printed, in order to verify that said characters, as printed, are correct.

2. The POS printer in accordance with claim 1, wherein said encoding module further comprises:

means for magnetizing said characters;

a read head for generating a signal waveform representative of each character; and electronic circuitry operatively connected to said read head for analyzing said signal waveforms, and wherein said means for printing includes a mechanism with the capability of using magnetic ink for printing the characters.

3. The POS printer in accordance with claim 1, wherein said encoding module further comprises:

a DC-biased read head for generating a signal waveform representative of each character;

means for analyzing said signal waveform; and wherein said means for printing includes a mechanism with the capability of using magnetic ink for printing the characters.

4. The POS printer in accordance with claim 1, wherein said encoding module encodes using an ANSI standard.

5. The POS printer in accordance with claim 1, wherein said encoding module encodes using an ISO standard.

6. The POS printer in accordance with claim 1, wherein said means for printing has a front end and said encoding module is disposed on said front end of said means for printing.

7. The POS printer in accordance with claim 1, wherein said encoding module includes a module separate from said means for printing.

8. A self-contained Point of Sale (POS) printer, comprising an encoding module, said encoding module comprising non-impact printing means for printing MICR characters in an amount field disposed along an edge of a front face of a check using magnetic ink, according to a predetermined standard.

9. A self-contained Point of Sale (POS) printer, comprising an encoding module, said encoding module having non-impact printing means for printing MICR characters in an amount field disposed along an edge of a front face of a check, using magnetic ink, according to a predetermined standard, said POS printer comprising means for reading said MICR characters to verify that the correct characters have been encoded onto said check.

10. The POS printer in accordance with claim 9, wherein said encoding module further comprises:

means for magnetizing said characters;

a read head for generating a signal waveform representative of each character; and electronic circuitry operatively connected to said read head for analyzing said signal waveforms, and wherein said means for printing includes a mechanism with the capability of using magnetic ink for printing the characters.

11. The POS printer in accordance with claim 9, wherein said means for printing includes means for using said magnetic ink to print said characters.

12. The POS printer in accordance with claim 9, wherein said encoding module further comprises:

a DC-biased read head for reading a signal waveform provided by each character;

electronic circuitry for analyzing said signal waveforms; and wherein said means for printing includes a mechanism using magnetic ink for printing the characters.

13. The POS printer in accordance with claim 9, wherein said predetermined standard comprises an ANSI standard.

14. The POS printer in accordance with claim 9, wherein said predetermined standard comprises an ISO standard.

15. The POS printer in accordance with claim 9, wherein said means for printing has a front end and said encoding module is disposed on said front end of said means for printing.

16. A self-contained Point of Sale (POS) printer, comprising an encoding module, said encoding module having means for non-impact printing MICR characters in an amount field disposed along an edge of a front face of a check, using magnetic ink, according to a predetermined standard, wherein said encoding module shares at least one component with said POS printer.

17. A Point of Sale (POS) printer as recited in claim 16, wherein said at least one component is a power supply.

* * * * *